US009639638B2

(12) United States Patent
Erhart

(10) Patent No.: US 9,639,638 B2
(45) Date of Patent: May 2, 2017

(54) METHODS AND SYSTEMS FOR NUMERICALLY SIMULATING PHYSICAL BEHAVIORS OF A STRING DRAWN OUT OF A YARN FEEDER

(71) Applicant: Livermore Software Technology Corporation, Livermore, CA (US)

(72) Inventor: Tobias Erhart, Stuttgart (DE)

(73) Assignee: Livermore Software Technology Corp., Livermore, CA (US)

( * ) Notice: Subject to any disclaimer, the term of this patent is extended or adjusted under 35 U.S.C. 154(b) by 541 days.

(21) Appl. No.: 14/338,545

(22) Filed: Jul. 23, 2014

(65) Prior Publication Data

US 2016/0012165 A1 Jan. 14, 2016

Related U.S. Application Data

(60) Provisional application No. 62/023,102, filed on Jul. 10, 2014.

(51) Int. Cl.
*G06F 7/60* (2006.01)
*G06F 17/50* (2006.01)

(52) U.S. Cl.
CPC ...... *G06F 17/5018* (2013.01); *G06F 2217/32* (2013.01)

(58) Field of Classification Search
None
See application file for complete search history.

(56) References Cited

U.S. PATENT DOCUMENTS 5,950,411 A * 9/1999 Simon ............ D01H 4/42
57/264
2007/0088453 A1 * 4/2007 Noriyuki ........ D04B 37/02
700/141

* cited by examiner

*Primary Examiner* — Craig Dorais
(74) *Attorney, Agent, or Firm* — Roger H. Chu

(57) ABSTRACT

Numerical simulation techniques of physical behaviors of a string drawn out of a yarn feeder in a weaving/braiding machine are disclosed. A FEA model, representing a string having a source end at yarn feeder and a braiding end towards braiding/weaving operations, contains at least one truss element with a leading element directly connected to the source end at which pull-out force of the yarn feeder is predefined. Maximum and minimum lengths of a truss element are predefined for facilitating local remeshing. Simulated physical behaviors of the string are obtained by performing a time-marching simulation using the FEA model with the FEA application module having local remeshing capability. Simulated physical behaviors include axial forces in each truss element of the FEA model and the string's deformed geometry. Local remeshing is used for updating the computerized model by creating new leading element that satisfies consistent realistic condition, when local remeshing becomes necessary.

20 Claims, 5 Drawing Sheets

100

102

Receive, in a computer system, a FEA model representing a string having a source end at a yarn feeder and a braiding end towards weaving/braiding operations, said FEA model containing at least one truss element with a leading element directly connected to the source end at which a pull-out force value ($T_{pullout}$) of the yarn feeder being predefined, maximum ($L_{max}$) and minimum ($L_{min}$) element length values are predefined for local remeshing

104

Obtain simulated physical behaviors (axial force, stress and deformed geometry) of the string by performing a time-marching simulation using the computerized model with a FEA application module having local remeshing capability, the time-marching simulation contains a series of consecutive solution cycles representing passage of time, detailed operations of each solution cycle are shown in FIG. 1B

*FIG. 1A*

METHODS AND SYSTEMS FOR NUMERICALLY SIMULATING PHYSICAL BEHAVIORS OF A STRING DRAWN OUT OF A YARN FEEDER

FIELD

The present invention generally relates to methods, systems and software product used in the area of computer-aided engineering analysis, more particularly to methods and systems used in obtaining numerically simulated physical behaviors of a string being drawn out of a yarn feeder in a weaving/braiding machine.

BACKGROUND

Computer-aided engineering analysis (CAE) has been used for assisting engineers/scientists for the past decades in designing products. One of the most popular CAE is finite element analysis (FEA), which is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are referred to as finite elements. The vertices of the finite elements are referred to as nodes. The model is comprised of a finite number of finite elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

Weaving/braiding is a dynamic process, where strings (i.e., yarns, wires, etc.) are drawn from several thread rolls and then bound together in a specific pattern. Similar to many other engineering tasks, CAE (e.g., FEA) has been used for designing such a weaving machine. In particular, simulated physical behaviors of a string being drawn out of a yarn feeder are obtained in a time-marching simulation using a CAE software. One of the shortcomings in prior art approaches is to require the entire yarn in the thread roll be modeled as a large number of finite elements (e.g., truss elements). As a result, it is not only tedious to create such a computerized model, but also inefficient in the numerical simulation thereafter due to the inclusion of many inactive elements located on the thread roll (i.e., only elements near braiding/weaving operations are important for obtaining the simulated physical behaviors).

It would therefore be desirable to have improved methods and systems for numerically simulating physical behaviors of a string drawn out of a yarn feeder in a weaving/braiding machine.

SUMMARY

This section is for the purpose of summarizing some aspects of the present application and to briefly introduce embodiments. Simplifications or omissions in this section as well as in the abstract and the title herein may be made to avoid obscuring the purpose of the section. Such simplifications or omissions are not intended to limit the scope of the present application.

Systems and methods for numerically simulating physical behaviors of a string/thread being drawn out of a yarn feeder in a weaving/braiding machine are disclosed. According to one aspect, a computerized model (e.g., FEA model) representing a string having a source end at a yarn feeder and a braiding end towards braiding/weaving operations is received in a computer system having a CAE application module (e.g., FEA software) installed thereon. The computerized model contains at least one truss element with a leading element directly connected to the source end, at which the pull-out force value of the yarn feeder is predefined. The CAE application module includes local remeshing capability (e.g., adding element into an existing computerized model). Maximum and minimum lengths of a truss element are predefined for facilitating local remeshing.

Simulated physical behaviors of the string are then obtained by performing a time-marching simulation using the computerized model with the CAE application module. At each solution cycle of the time-marching simulation, axial stress, axial force and deformed geometry of each truss element are calculated, then the leading element's length is updated by adding a payout length when the calculated axial force is greater than the predefined pull-out force value, where the unknown payout length is obtained by solving a non-linear payout function such that the axial force of the leading element is limited to the predefined tension value, and the FEA model is adjusted by creating a new leading element when the just updated leading element's length is greater than the predefined maximum element length value. And the newly created leading element's length being at least the predefined minimum element length value.

Objects, features, and advantages of the present invention will become apparent upon examining the following detailed description of an embodiment thereof, taken in conjunction with the attached drawings.

BRIEF DESCRIPTION OF THE DRAWINGS

In the accompanying drawings:

FIGS. 1A and 1B collectively is a flowchart illustrating an example process of numerically simulating physical behaviors of a string drawn out of a yarn feeder in a braiding/weaving machine, according to one embodiment of the present invention;

DETAILED DESCRIPTION OF EMBODIMENTS

In the following description, numerous specific details are set forth in order to provide a thorough understanding of embodiments of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-6. However, those skilled in the art will readily appreciate that the detailed description given herein with respect to these figures is for explanatory purposes as the invention extends beyond these limited embodiments.

Figure 1B:
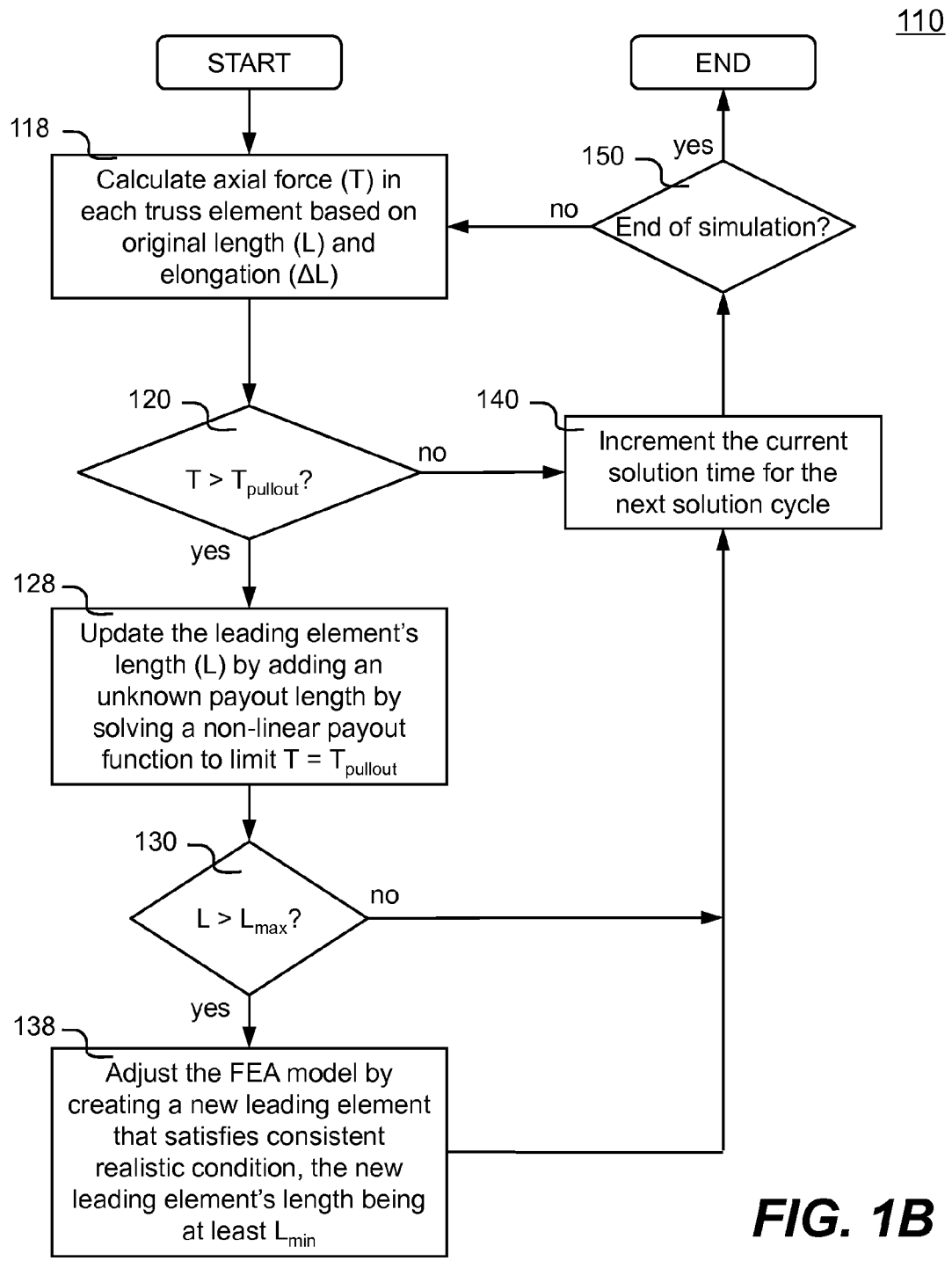

Referring first to FIGS. 1A-1B, it is collectively shown a flowchart illustrating an example process 100 of numerically simulating physical behaviors of a string being drawn out of a yarn feeder in a braiding/weaving machine according to an embodiment of the present invention. Process 100 is preferably implemented in software and understood with other figures in this document.

Figure 6:
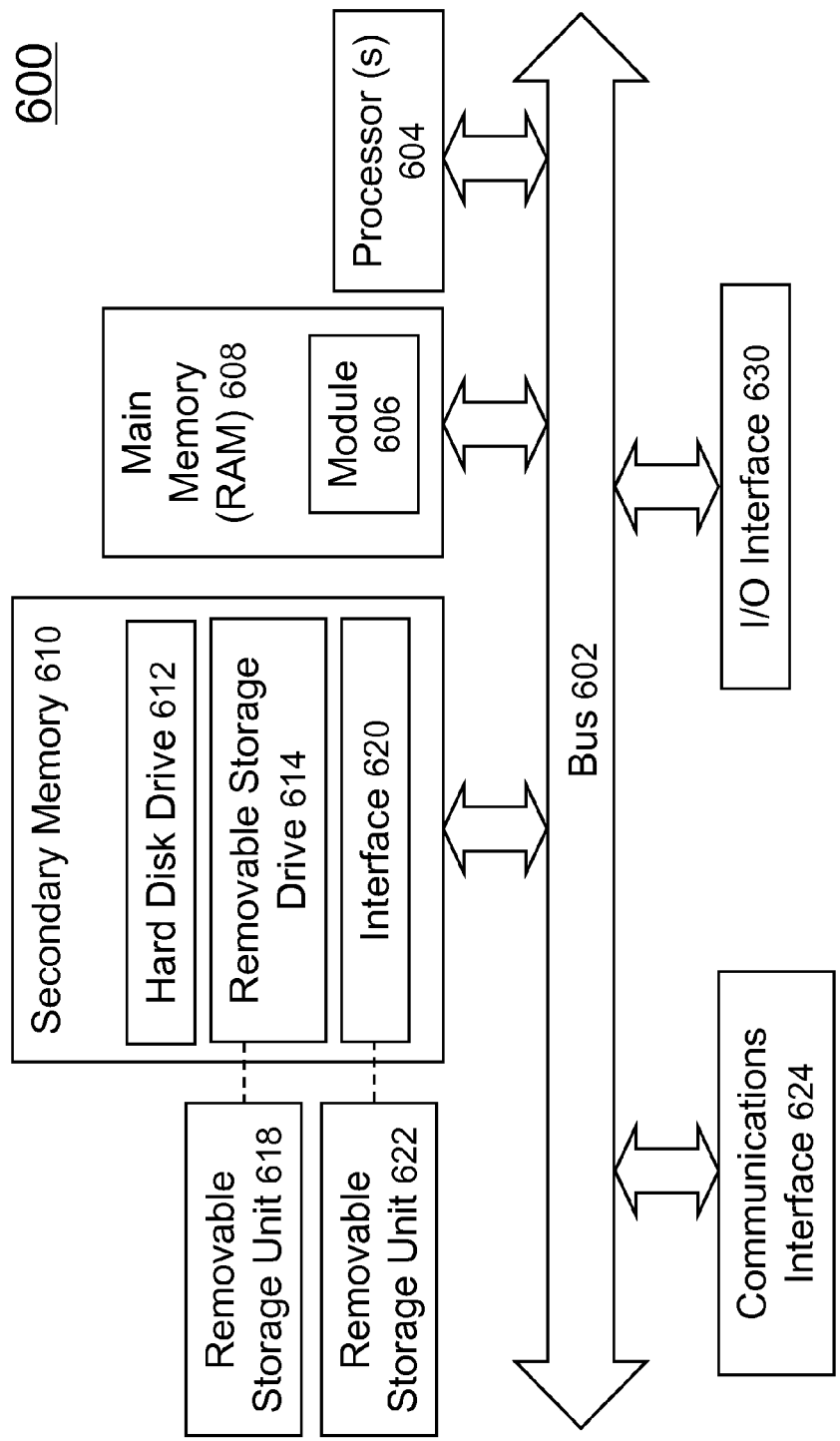
FIG. 6 is a function block diagram showing salient components of an exemplary computer system, in which one embodiment of the present invention may be implemented.

Process 100 starts at step 102 by receiving a computerized model (e.g., finite element analysis (FEA) model) representing a string having a source end at the yarn feeder and a braiding end towards weaving/braiding operations in a computer system (e.g., computer system 600 shown in FIG. 6). A FEA application module having local remeshing capability is installed on the computer system. The computerized model contains at least one truss element with a leading element directly connected to the source end, at which a pull-out force value ($T_{pullout}$) of the yarn feeder is predefined. Additionally, maximum ($L_{max}$) and minimum ($L_{min}$) element length values are predefined for facilitating local remeshing technique in the FEA application module.

Figure 2:
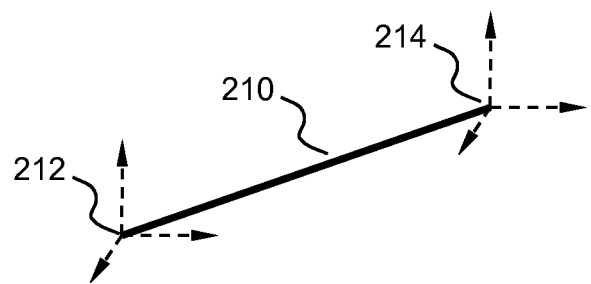
FIG. 2 is a diagram showing a three-dimension truss element.
Figure 3:
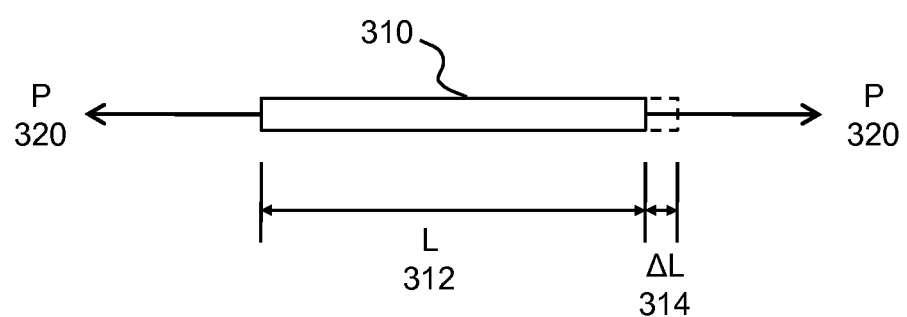
FIG. 3 is a diagram showing truss element's original and deformed configurations under a tension force.

An example truss element 210 shown in FIG. 2 has two end nodes 212-214 that define the length of the element 210. In a three-dimensional space, each of the nodes 212-214 has three translational degrees-of-freedom (shown as dotted line arrows). Truss element 212 is associated with a material property (e.g., cotton, plastic, steel, etc.). FIG. 3 shows that a truss element 310 under tension force (P) 320. As a result, the original length (L) 312 of the truss element 310 is stretched by an elongation ($\Delta L$) 314. Deformed length (L+$\Delta L$) of truss element 310 is the sum of the original length 312 and the elongation 314 due to the tension force 320. Implementing the physical behaviors of truss element 310 in the FEA application module can be done with well-known methods (e.g., associated with a material model).

$T_{pullout}$ is the amount of force required for pulling yarn material out of the yarn feeder. In other words, $T_{pullout}$ is used for determining whether new string needs to be drawn out of the yarn feeder and be added to the existing FEA model. Details with respect to how to use $T_{pullout}$ in the FEA application module can be found in FIG. 1B and corresponding descriptions below.

$L_{max}$ is used for limiting each truss element's length not longer than specified/predefined maximum length. Well known techniques have been used for established $L_{max}$ in the art of FEA. For example, each truss element should be limited to a specific length to avoid numerical problem. As for $L_{min}$, it is used for ensuring a minimum length for newly created leading element to avoid numerical instability. For example, a truss element should never be shorter than its cross-section's characteristic dimension (e.g., diameter).

Next, at step 104, process 100 obtains simulated physical behaviors of the string by conducting a time-marching simulation using the FEA model with the FEA application module in the computer system. The time-marching simulation contains a series of consecutive solution cycles representing passage of time. Simulated physical behaviors include, but are not necessarily limited to, axial force, axial stress and deformed geometry.

Figure 4:
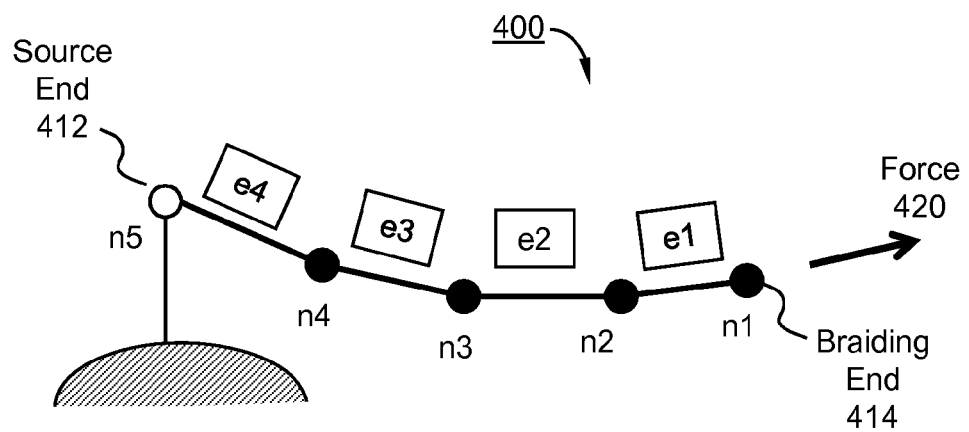
FIG. 4 is a diagram showing an example computerized model having at least one truss element with a leading element directly connected to the source end of a string in accordance with an embodiment of the present invention.

An example FEA model 400 contains four truss elements (e1, e2, e3 and e4) representing a string is shown in FIG. 4. The string contains two ends: source end 412 at node n5 and braiding end 414 at node n1. At source end 412, yarn material comes out of the yarn feeder being added to the leading element e4. Each of the truss elements has two nodes, for example, element e1 with nodes n1 and n2, element e2 with nodes n2 and n3, etc. Force 420 is shown pulling the string at node n1. It is noted that the FEA model can contain different number of truss elements to achieve the same object of the present invention. According to one embodiment, a prescribed motion can be imposed on the source node n5 to numerically represent a moving yarn feeder.

As a result of relative displacements between the source end and the braiding end of the string, tension force of the truss elements can change/evolve over time during the braiding/weaving operations. When the tension force reaches the pull-out force of the yarn feeder, yarn material will be drawn out of the yarn feeder. Numerically, additional string is added to the leading element next to the source end. And the tension force cannot exceed the predefined pull-out force value.

Referring now to FIG. 1B, it is shown detailed operations of each solution cycle of the time-marching simulation. Process 110 starts by calculating axial force (T) of each truss element of the FEA model using well known FEA procedures at step 118. Axial force (T) is a function of original length (L) and deformed length (L+$\Delta L$) and associated material property.

Next at decision 120, it is determined whether just calculated axial force in the leading element is greater than the predefine pull-out force value. If not, process 110 follows "no" path to step 140, in which the current solution time is incremented for the next solution cycle (e.g., incrementing a time step size $\Delta t$). If decision 120 is true, process 110 moves to step 128 to update the leading element's length by adding an unknown payout length, which is obtained by solving a non-linear payout function such that axial force (T) is limited to the predefined pull-out force value $T_{pullout}$. According to one embodiment, the well-known Brent-Dekker algorithm is used for solving the non-linear payout function.

Process 110 moves to decision 130, it is determined whether the updated length of the leading element is greater than the predefined maximum element length value ($L_{max}$). If not, process 110 following the "no" path to step 140.

Otherwise, process 110 moves to step 138 to adjust the FEA model by creating a new leading element. The newly created leading element's length is at least the predefined minimum element length value ($L_{min}$) and satisfies a consistent condition. Process 110 moves to step 140 thereafter. In one embodiment, additional percentages are added to the $L_{min}$ to ensure the predefined length requirements.

Figure 5:
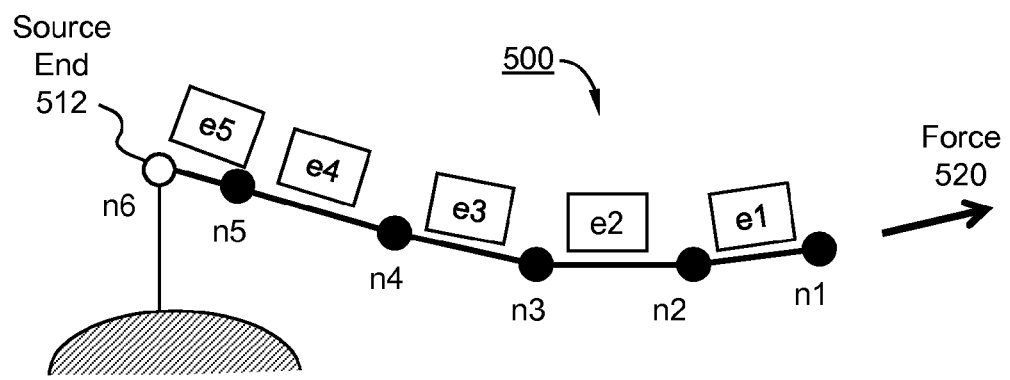
FIG. 5 is a diagram showing the example computerized model of FIG. 4 with a newly created leading element.

To demonstrate newly created leading element, another example FEA model 500 pulled by force 520 is shown in FIG. 5. A new node n6 for the source end 512 and a new leading element e5 are created when the length of the existing leading element e4 exceeds a predefined maximum element length value $L_{max}$. A local remeshing operation is performed to facilitate the additional node n6 and new leading element e5. Element e4 is split into two elements with forces acted on them fulfilling consistent equilibrium condition.

Before process 110 moves on to next solution cycle repeating steps 118-140, it is determined whether the time-marching simulation is ended at decision 150. Checking the end condition can be achieved with well-known techniques, for example, comparing the current simulation time with the total simulation time. Simulated physical behaviors of the string are obtained for each solution cycle.

According to another embodiment, braiding/weaving operations can be numerically simulated with more than one strings modeled in a time-marching simulation.

An embodiment of the present invention is directed towards one or more computer systems capable of carrying out the functionality described herein. An example of a computer system 600 is shown in FIG. 6. The computer system 600 includes one or more processors, such as processor 604. The processor 604 is connected to a computer system internal communication bus 602. Various software embodiments are described in terms of this exemplary computer system. After reading this description, it will become apparent to a person skilled in the relevant art(s) how to implement the invention using other computer systems and/or computer architectures.

Computer system 600 also includes a main memory 608, preferably random access memory (RAM), and may also include a secondary memory 610. The secondary memory 610 may include, for example, one or more hard disk drives 612 and/or one or more removable storage drives 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 622 and interfaces 620 which allow software and data to be transferred from the removable storage unit 622 to computer system 600. In general, Computer system 600 is controlled and coordinated by operating system (OS) software, which performs tasks such as process scheduling, memory management, networking and I/O services.

There may also be a communications interface 624 connecting to the bus 602. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals which may be electronic, electromagnetic, optical, or other signals capable of being received by communications interface 624. The computer 600 communicates with other computing devices over a data network based on a special set of rules (i.e., a protocol). One of the common protocols is TCP/IP (Transmission Control Protocol/Internet Protocol) commonly used in the Internet. In general, the communication interface 624 manages the assembling of a data file into smaller packets that are transmitted over the data network or reassembles received packets into the original data file. In addition, the communication interface 624 handles the address part of each packet so that it gets to the right destination or intercepts packets destined for the computer 600. In this document, the terms "computer program medium", "computer usable medium", and "computer readable medium" are used to generally refer to media such as removable storage drive 614, and/or a hard disk installed in hard disk drive 612. These computer program products are means for providing software to computer system 600. The invention is directed to such computer program products.

The computer system 600 may also include an input/output (I/O) interface 630, which provides the computer system 600 to access monitor, keyboard, mouse, printer, scanner, plotter, and alike.

Computer programs (also called computer control logic) are stored as application modules 606 in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform features of the present invention. Accordingly, such computer programs represent controllers of the computer system 600.

In an embodiment where the invention is implemented using software, the software may be stored in a computer program product and loaded into computer system 600 using removable storage drive 614, hard drive 612, or communications interface 624. The application module 606, when executed by the processor 604, causes the processor 604 to perform the functions of the invention as described herein.

The main memory 608 may be loaded with one or more application modules 606 that can be executed by one or more processors 604 with or without a user input through the I/O interface 630 to achieve desired tasks. In operation, when at least one processor 604 executes one of the application modules 606, the results are computed and stored in the secondary memory 610 (i.e., hard disk drive 612). The status of the computer simulation (e.g., finite element analysis results) is reported to the user via the I/O interface 630 in either text or graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas four/five truss elements have been shown and described as an example of the FEA model representing the string, the present invention only requires at least one truss element to represent a string. Additionally, whereas the Brent-Dekker algorithm has been described for solving non-linear payout condition, other well-known numerical techniques can be used to achieve the same. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of numerically simulating physical behaviors of a string being drawn out of a yarn feeder in a weaving/braiding machine comprising:
   receiving, in a computer system having a finite element analysis (FEA) application module with local remeshing capability installed thereon, a FEA model representing a string having a source end at a yarn feeder and a braiding end towards braiding/weaving operations of a weaving/braiding machine, said FEA model containing at least one truss element with a leading element directly connected to the source end, at which a pull-out force value of the yarn feeder is predefined, and maximum and minimum element length values are predefined for facilitating local remeshing;
   obtaining simulated physical behaviors of the string by conducting a time-marching simulation using the FEA model with the FEA application module in the computer system, at each solution cycle of the time-marching simulation,
      calculating axial stress, axial force and deformed geometry of each truss element,
      updating the leading element's length by adding a payout length when the calculated axial force is greater than the predefined pull-out force value, wherein the payout length is obtained by solving a non-linear payout function such that the axial force of the leading element is limited to the predefined tension value, and
      adjusting the FEA model by creating a new leading element when the just updated leading element's length is greater than the predefined maximum element length value, the newly created leading element's length being at least the predefined minimum element length value.

2. The method of claim 1, wherein said string is modeled with a material property model.

3. The method of claim 2, wherein the axial force is calculated using said each truss element's original length, deformed length and the material property model.

4. The method of claim 1, wherein said predefined pull-out force value is a constant during the time-marching simulation.

5. The method of claim 1, wherein said predefined pull-out force value varies during the time-marching simulation.

6. The method of claim 1, wherein the non-linear payout function is solved using Brent-Dekker root finding algorithm.

7. The method of claim 1, wherein said newly created leading element is assigned the axial force of the just updated leading element.

8. A system of numerically simulating physical behaviors of a string being drawn out of a yarn feeder in a weaving/braiding machine comprising:
   an input/output (I/O) interface;
   a memory for storing computer readable code for finite element analysis (FEA) application module with local remeshing capability;
   at least one processor coupled to the memory, said at least one processor executing the computer readable code in the memory to cause said FEA application module to perform operations of:
   receiving a FEA model representing a string having a source end at a yarn feeder and a braiding end towards braiding/weaving operations of a weaving/braiding machine, said FEA model containing at least one truss element with a leading element directly connected to the source end, at which a pull-out force value of the yarn feeder is predefined, and maximum and minimum element length values are predefined for facilitating local remeshing;
   obtaining simulated physical behaviors of the string by conducting a time-marching simulation using the FEA model with the FEA application module, at each solution cycle of the time-marching simulation,
      calculating axial stress, axial force and deformed geometry of each truss element,
      updating the leading element's length by adding a payout length when the calculated axial force is greater than the predefined pull-out force value, wherein the payout length is obtained by solving a non-linear payout function such that the axial force of the leading element is limited to the predefined tension value, and
      adjusting the FEA model by creating a new leading element when the just updated leading element's length is greater than the predefined maximum element length value, the newly created leading element's length being at least the predefined minimum element length value.

9. The system of claim 8, wherein said string is modeled with a material property model.

10. The system of claim 9, wherein the axial force is calculated using said each truss element's original length, deformed length and the material property model.

11. The system of claim 8, wherein said predefined pull-out force value is a constant during the time-marching simulation.

12. The system of claim 8, wherein said predefined pull-out force value varies during the time-marching simulation.

13. The system of claim 8, wherein the non-linear payout function is solved using Brent-Dekker root finding algorithm.

14. A non-transitory computer readable storage medium containing computer executable instructions for numerically simulating physical behaviors of a string being drawn out of a yarn feeder in a weaving/braiding machine by a method comprising:
   receiving, in a computer system having a finite element analysis (FEA) application module with local remeshing capability installed thereon, a FEA model representing a string having a source end at a yarn feeder and a braiding end towards braiding/weaving operations of a weaving/braiding machine, said FEA model containing at least one truss element with a leading element directly connected to the source end, at which a pull-out force value of the yarn feeder is predefined, and maximum and minimum element length values are predefined for facilitating local remeshing;

obtaining simulated physical behaviors of the string by conducting a time-marching simulation using the FEA model with the FEA application module in the computer system, at each solution cycle of the time-marching simulation,
- calculating axial stress, axial force and deformed geometry of each truss element,
- updating the leading element's length by adding a payout length when the calculated axial force is greater than the predefined pull-out force value, wherein the payout length is obtained by solving a non-linear payout function such that the axial force of the leading element is limited to the predefined tension value, and
- adjusting the FEA model by creating a new leading element when the just updated leading element's length is greater than the predefined maximum element length value, the newly created leading element's length being at least the predefined minimum element length value.

15. The non-transitory computer readable storage medium of claim 14, wherein said string is modeled with a material property model.

16. The non-transitory computer readable storage medium of claim 15, wherein the axial force is calculated using said each truss element's original length, deformed length and the material property model.

17. The non-transitory computer readable storage medium of claim 14, wherein said predefined pull-out force value is a constant during the time-marching simulation.

18. The non-transitory computer readable storage medium of claim 14, wherein said predefined pull-out force value varies during the time-marching simulation.

19. The non-transitory computer readable storage medium of claim 14, wherein the non-linear payout function is solved using Brent-Dekker root finding algorithm.

20. The non-transitory computer readable storage medium of claim 14, wherein said newly created leading element is assigned the axial force of the just updated leading element.

* * * * *